March 23, 1971 H. H. PINKLEY 3,572,353
CONVERTIBLE TOPS FOR BOATS
Filed April 1, 1969 2 Sheets-Sheet 1
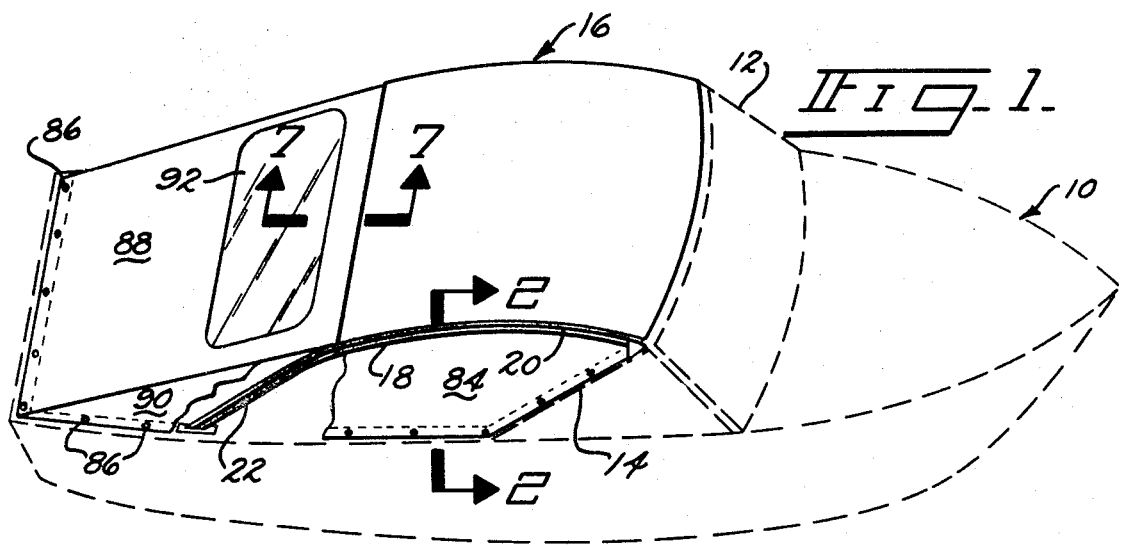
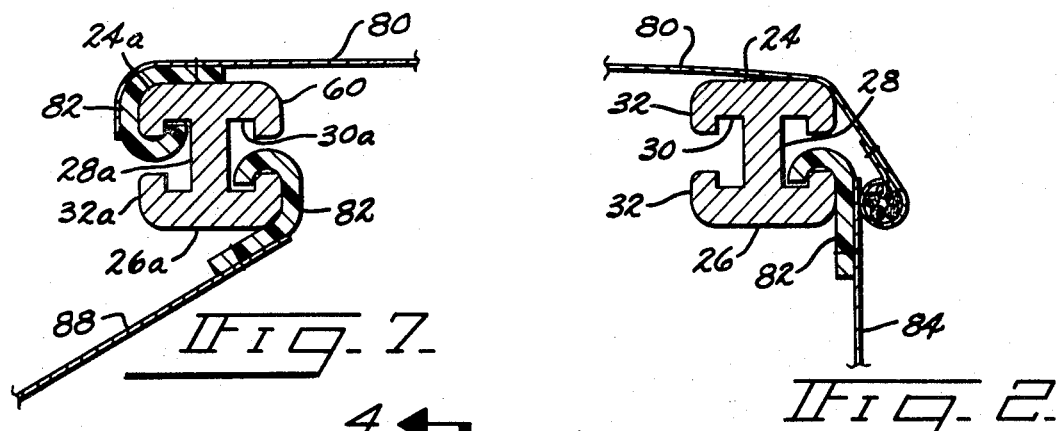
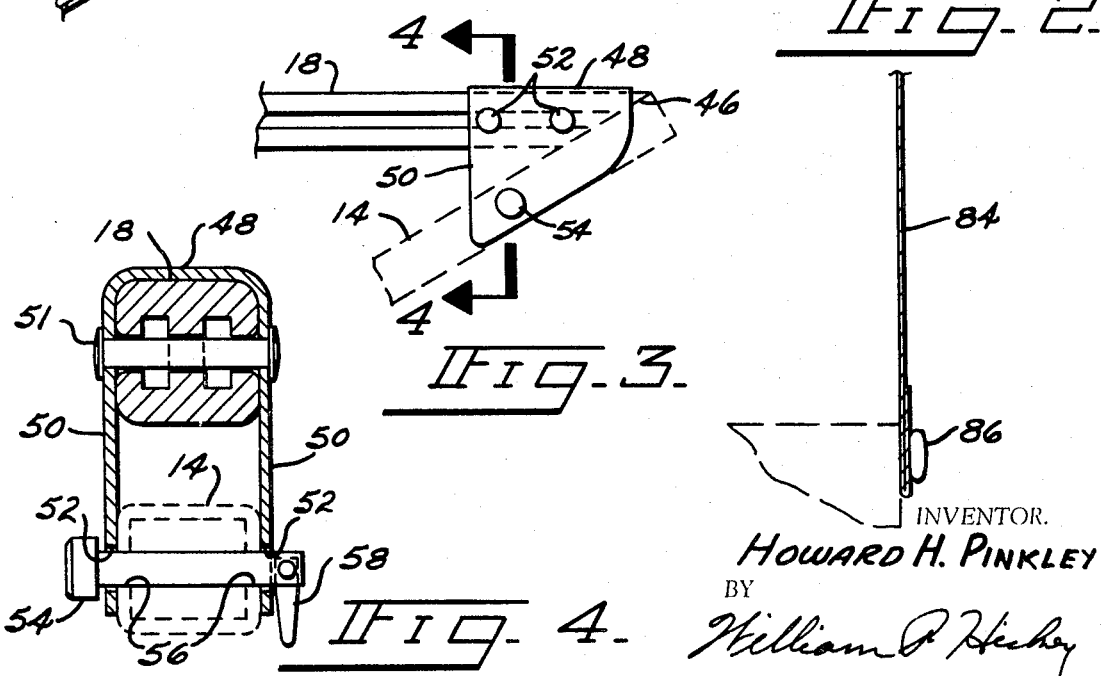
INVENTOR.
HOWARD H. PINKLEY
BY
William P. Hickey
ATTORNEY

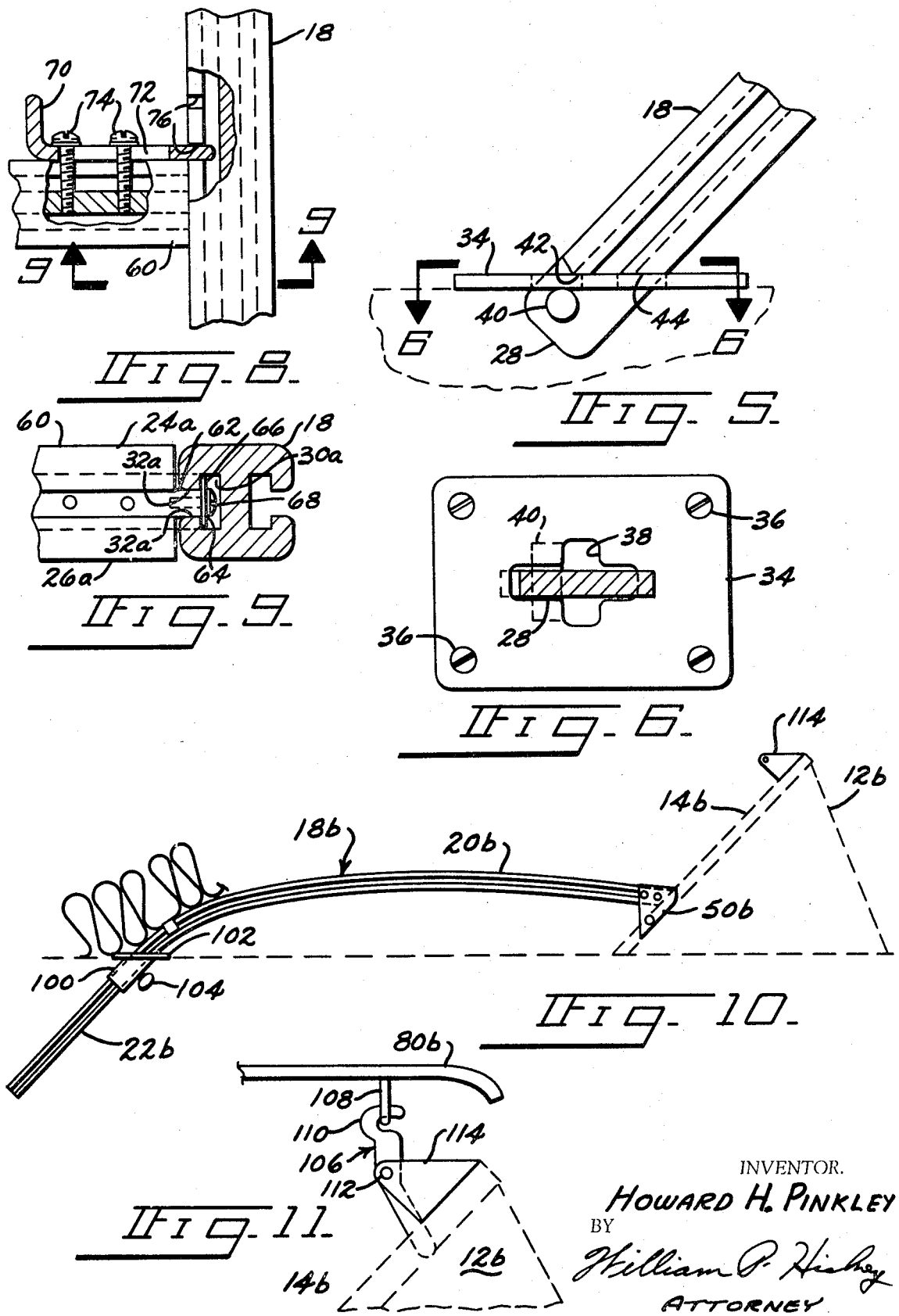

United States Patent Office 3,572,353
Patented Mar. 23, 1971

3,572,353
CONVERTIBLE TOPS FOR BOATS
Howard H. Pinkley, 5725 Edgewater Drive
Toledo, Ohio 43613
Filed Apr. 1, 1969, Ser. No. 811,966
Int. Cl. B63b 17/02, 19/00
U.S. Cl. 135—6                                     18 Claims

ABSTRACT OF THE DISCLOSURE

A convertible top for boats and the like having a deck or support structure surrounding a passenger compartment and preceded by a windshield. Removable side rails extend from the top side edge of the windshield over the passenger seating area, and then downwardly to the deck. A cross bar extends between the rear of the front generally horizontal portion of the side rails. Sheet material extends between the side rails, with the front end thereof secured to the windshield, and the rear end thereof secured to the cross bar. The sheet material can be slid rearwardly and gathered adjacent the cross bar, or in some instances, the cross bar and the sheet material is slid forwardly and gathered adjacent the windshield. In either case, the material is stored in an elevated position above the heads of seated passengers. The canopy may also include a second section of sheet material extending between the cross bar, and the rear of the passenger compartment. In one embodiment of the invention, the side rails can be slid downwardly and rearwardly from their normal elevated position to a position adjacent the deck to serve as hand rails.

BACKGROUND OF THE INVENTION

All of the removable canopy structures for boats with which I am familiar employ cumbersome support structure, which either have portions which must be removed when the canopy is folded up and stored, or employ bows which are hinged to the deck just rearwardly of the windshield and extend upwardly at an angle to support the canvas or plastic top. Since the bows are hinged to the deck at their lower end and their upper end is limited by the position of the "top," the radius arm of the bow is limited. When such structures are folded down for storage, the bows must either be swung forward to a position in front of the windshield, or must be folded rearwardly, which because of the limited radius arm, extends across the passenger compartment at deck level. At either position, such pivoted bows are a nuisance, and either obstruct visibility, or prevent movement of the passengers forward and aft of the passenger compartment, or both. What is more, in many instances, these canopies are folded rearwardly, and a separate mooring cover structure is installed over the entire passenger compartment to keep rain, etc., out of the passenger compartment when the boat is not in use.

An object of the present invention is the provision of a new and improved foldable canopy structure for a boat and the like which can be put "up" or taken "down" without removing structure, and which stores the top and its supporting members in locations which do not appreciably interfere with the movement of passengers about the passenger compartment.

A further object of the invention is the provision of a new and improved canopy structure of the above described type which is simple in design, rugged in construction, and inexpensive to manufacture.

Further objects and advantages will become apparent to those skilled in the art to which the invention relates from the following specification and attached drawings.

SUMMARY OF THE INVENTION

According to the invention, there is provided, a pair of side rails each having a front generally horizontal portion, the front end of which is fastened to a respective top side edge of the windshield of a boat, and which extends rearwardly over the seating area of the passenger compartment. The side rails also include a rear generally downwardly extending portion, the bottom end of which is suitably affixed to the deck or support structure which surrounds the passenger compartment. The canopy structure further includes at least one and preferably two cross bars which extend between the side rails, and one of which is normally positioned adjacent the rear end of the horizontal section of the side rails, and the other of which is centered between the windshield and the rear rail. The water deflection sheet material or "top" of the canopy extends between the side rails, with the front end thereof having suitable means for fastening to the top of the windshield, and having other suitable means for fastening the rear end thereof to the cross bar. The front generally horizontal section of the side rails are preferably bowed so that tension of the sheet material between the windshield and cross bar, supplies a force which holds the sheet material against the side rails. The sheet material may be unfastened from the windshield and slid rearwardly to a position adjacent the cross bar for storage, or in some instances, the cross bar is slidably mounted on the side rails, and the cross bar and the sheet material are slid forwardly and stored adjacent the front top edge of the windshield. In either position, the cross bar and "top" provide a minimum of obstruction to the use of the passenger compartment.

The canopy may also include a second section of sheet material the front edge of which is suitably fastened to the cross bar, and the rear end of which is suitably fastened to the support structure at the rear of the passenger compartment. This second section of sheet material may be unfastened from the rear of the passenger compartment and be slid forwardly for storage at the elevated position adjacent the cross bar, or may be unfastened from the cross bar and be stored adjacent the deck at the rear end of the passenger compartment. In either position, the stored second section of sheet material will provide a minimum of obstruction to the use of the passenger compartment.

Suitable side curtains are installed between the side rails and the deck, and between the second section of sheet material and the deck to complete the enclosure of the passenger compartment. The structure is such that the entire passenger compartment is enclosed in a manner which allows occupancy by passengers. By providing a window of transparent sheet material in the second section adjacent the cross bar, rearward visibility is had for the passengers.

The side rails and/or cross bars are preferably provided with at least one, and preferably two, recesses which open outwardly of their side surfaces, and which are partially closed by retaining lips which project towards each other. The recesses provide retaining means for securing the sheet material to the side rails and/or cross bar, and/or the cross bar to the side rails. In some instances, a brace which extends downwardly and rearwardly from the top of the windshield may be used as a guide for the raising and lowering of the side rails. In this case, the rear end of the side rails extend downwardly and rearwardly through the deck at the same angle. These side rails are slid downwardly and rearwardly, and the front and rear ends thereof are adjustably clamped to the windshield brace and deck respectively. When such a side rail is moved into its lower most position, it acts as a hand rail. The cross bar will, of course, move rearwardly and downwardly along with the side rails; and if the rear end of the side rail is located close to the rear end of the passenger compartment, the cross bar and both sections of sheet material will be nested at the very rear end of the passenger compartment.

BRIEF DESCRIPTION OF THE DRAWINGS

FIG. 1 is an isometric view of a boat and the foldable canopy structure of the present invention;

FIG. 2 is a cross sectional view taken approximately on the line 2—2 of FIG. 1;

FIG. 3 is a fragmentary side elevational view of a connection between the side rails and the windshield structure;

FIG. 4 is a sectional view taken approximately on the line 4—4 of FIG. 3;

FIG. 5 is a fragmentary side view of the connection between the rear end of the side rails and the deck structure at the side of the passenger compartment;

FIG. 6 is a sectional view taken approximately on the line 6—6 of FIG. 5;

FIG. 7 is a sectional view taken approximately on the line 7—7 of FIG. 1;

FIG. 8 is a fragmentary plan view of the connection between the cross bar and side rail;

FIG. 9 is a sectional view taken approximately on the line 9—9 of FIG. 8;

FIG. 10 is a fragmentary side elevational view of another embodiment of the present invention; and FIG. 11 is a fragmentary side view of a latch for fastening the top to the windshield.

DESCRIPTION OF THE PREFERRED EMBODIMENTS

FIG. 1 of the drawings shows the outline of a boat 10 including its windshield 12 and bracing side wings 14 therefor in dashed lines. The canopy structure 16 shown by solid lines, generally comprises a pair of generally parallel side rails 18 having a front generally horizontal portion 20 which extends over the front seating area of the passenger compartment, and a downwardly extending rear portion 22. The bottom end of the rear portion 22 is suitably fixed to the portion of the deck surrounding the passenger compartment by the means shown in FIGS. 5 and 6.

While the side rails 18 may be otherwise embodied, they are herein shown as having a generally I-beam configuration, the top and bottom flanges 24 and 26 of which are connected by a web 28. A pair of recesses 30 are provided on opposite sides of the web 28, and recesses 30 are partially closed off by a pair of retaining lips 32 which are fixed to the outer edges of the respective flanges, and which project towards each other. The entire configuration is conveniently made as an extruded metal shape, the metal of which is preferably aluminum.

The means shown in FIGS. 5 and 6 for retaining the back end of the side rails 18 to the deck, generally comprises a flat plate 34 which is positioned over an opening, not shown, in the deck, and which is secured in place by a plurality of fasteners 36. The plate 34 has a cross-shaped opening 38 therethrough, the longitudinal dimension of which extends longitudinally of the plate in line with the web of the side rails 18. The end portions of the flanges 24 and 26 are trimmed off at an angle to provide a horizontal end surface 42, 44 for abutment with the top surface of the plate 34. The remaining web 28 is caused to project through the cross-shaped opening 38, and is provided with a short transverse pin 40 adapted to fit through the lateral arms of the cross-shaped opening 38. The side rails 18 are installed by tilting their rear end portions into a generally vertical position and causing the web 28 to pass through the longitudinal portion of the opening 38 and the cross pin 40 to pass through the lateral arms of the opening 38. Thereafter the side rails 18 are rotated forwardly to being the angularly trimmed edges 42, 44 of the flanges 24 and 26, respectively, adjacent the top surface of the plate 34, and the rails are then slid rearwardly to move the pin 40 underneath the section of the plate that is rearwardly of the lateral arms of the opening 38. The rotating and rearward movement of the side rails brings the front beveled ends 46 of the side rails 18 flush against the top surface of the side braces 14 where they are secured in place by suitable brackets 48, as for example that shown in FIGS. 3 and 4. The bracket 48 shown is of a generally U-shaped cross section, and is positioned over the top of the side rail 18 with its legs 50 extending downwardly on either side thereof. Suitable fasteners 51 secure the brackets 48 to the side rails 18, and the bottom end of each of the legs 50 is provided with an opening 52 therethrough adapted to receive a toggle pin 54, or other suitable removable securing means. The side braces 14 are provided with openings 56 therethrough, located to align with the openings 52, and the toggle pin 54 is inserted through the aligned openings. The dog 58 is then pivoted transversely to prevent inadvertent endwise removal of the toggle pin 54.

The side rails 18 are braced intermediate their front and rear end portions by one or more cross bars 60. These cross bars may be of any suitable cross section, and as shown in FIG. 7, are preferably of the same cross section as are the side rails 18. Those portions of the cross arms 60 which are similar to corresponding portions of the side rails, are designated by a like reference numeral characterized further in that a subscript "a" is affixed thereto. The cross arm 60 may be rigidly fixed at its opposite ends to the respective side rails 18, but is preferably connected in such a way as to be slidable longitudinally of the side rails 18. U-shaped straps similar to those shown in FIGS. 3 and 4 can be used, but as shown in FIGS. 8 and 9 of the drawings, are preferably connected to the side rails by trimming off the flange portions 24a and 26a along with the ends of the web 28a, to leave a projecting end portion 62 of the web 28a which has a sliding fit with respect to the lips 32a The projecting portion 62 of the web has a length slightly greater than the width of the lips 32a, and suitable means 64 are provided in the recess 30a for retaining the web portion 62 in place. As shown in the drawing, this is conveniently accomplished by means of a roller, formed by a washer 66, having a machine screw 68 extending therethrough, and screwed into the end of the web portion 62. The roller 66 is inserted into the recess 30a through openings, not shown, formed by the removal of short lengths of the lips 32a. The cross bar 60 can be slid the entire length of the side rails 18, and can be locked to the side rails, by any suitable clamping means. As shown in FIG. 8, this is conveniently accomplished by an L-shaped dog 70 having a slotted opening 72 therethrough, through which machine screws 74 which are screwed into the cross bar 60. Spaced apart notches 76 are provided in the lips 32a lengthwise of the side rails, and the dog 70 is slid into an opening 76 to lock the cross bar 60 against sliding movement along the side rails 18.

The canopy structure includes at least one section of foldable cover, or sheet material 80, which extends over the top of the horizontal side rail portions 20, with the front end thereof suitably affixed to the top edge of the windshield and the rear end thereof suitably fixed to the cross bar 60. The front generally horizontal sections 20 of the side rails 18 are preferably bowed, so that tension between the windshield and the cross bar 60 holds the sheet material 80 downwardly into engagement with the side rails 18. A plurality of cross bars 60 are preferably provided along the front generally horizontal portion 20 of the side rails, to support the sheet material 80. These cross bars are, of course, slidable lengthwise of the side rails 18. Any suitable means can be used to secure the sheet material 80 to the windshield, to the rear cross arm 60, and to the side rail portions 20, if desired. As shown in the drawing, this is conveniently accomplished by means of generally rigid plastic sections 82 having a J-cross section. The upstanding leg of the J is sewn to the sheet material, and the curved portion of the J extends around a lip 32, or 32a, as the case may be. The J-sections 82 may, if desired, be continuous along the cross arm 60. Along the side rail portions 18, the J-strip is preferably intermittent so that the top can be folded between the clips 82 and be slid lengthwise of the rails 18. The cover section 80 can be conveniently stored in the folded condition, either adjacent the windshield 12, or adjacent the rear cross bar 60.

Side curtains 84 can be installed between the side rails 18 and the side of the boat. The side curtain 84 may be fastened to the boat and to the side rails 18 in any suitable manner, and as shown in FIG. 2, is fastened to the side rails 18 by the J-strip 82, and to the boat by snap fasteners 86.

The canopy preferably also includes a second section of sheet material 88 which extends from the rear cross bar 60 to the boat structure at the end of the passenger compartment. The second section 88 may be secured in place by any suitable means, and as shown in FIG. 7, is fastened to the cross arm by the J-strip 82, and to the rear end of the boat by snap fasteners 86. The second section of sheet material 88 also includes side curtain portions 90 which are sewn thereto and which are fastened to the boat by fasteners 86, and to the side rails 18 by J-strip 82. The second section of curtain may in some instances be integral with the section 80, in which case it will be stored adjacent the rear cross arm 60. In other instances, however, it may be desirable to remove the front edge of the section 88 from the cross arm 60 and be folded down adjacent the rear end of the passenger compartment. The second section of sheet material 88 is preferably also provided with a window 92 of a clear plastic sewn in place, as is well known in the art.

It will be seen that when the section 80 is stored adjacent the front windshield, and the rear section 88 is stored in the rear of the boat, the cross arm 60 can be slide forwardly so that none of the structure overlies the passenger compartment. It will not be objectionable, however, to slide the front sheet material 80, and any intermediate supporting cross bars 60 rearwardly to a position adjacent the rear cross bar 60, and to slide the rear section 88 of sheet material forwardly to a position adjacent the rear cross bar 60 where both sections can be strapped in place. In this position, the structure will be above the heads of seated occupants, and the occupants, by stooping, can pass underneath the stored structure. If desired, both sections of top sheet material and the cross bar, or cross bars, as the case may be, can be slid to a notched out section of the side rails and removed for easy storage elsewhere.

A second embodiment of canopy is shown in FIGS. 10 and 11 of the drawings. Those portions of the embodiments shown in FIGS. 10 and 11 which correspond to portions of the embodiment previously described are designated by a like reference numeral, characterized further in that a suffix "b" is affixed thereto. The embodiment shown in FIGS. 10 and 11 differs from the previously described embodiment principally in that the structure 34 of the previous embodiment for fastening the rear end of the side rails to the boat structure is replaced by a generally tubular socket 100. The tubular socket 100 has an opening therethrough the side walls of which have a sliding fit relative to the side rails 18b. Each tubular socket 100 is inclined at the same angle as is the top of the side wings 14b, and each has a plate 102 on its upper surface for securing to the top surface of the boat deck. A thumb screw 104 or other suitable locking means is provided for clamping the side rail 18b into an adjusted position with respect to the tubular socket 100. It will now be seen that the rear portion 22b of the side rails 18b will slide through the sockets 100 when the brackets 50b are slid along the side wings 14, and the entire side rails 18b are raised or lowered. In the lower position, the side rails 18b will act as hand rails.

The sheet material 80b can be secured to the windshield 12b in any suitable manner, and as shown in the drawing is secured by an over center latch 106. A metal loop 108 is secured to the front portion of the sheet material 80b in a position to be caught by the hook shaped end 110 of the latch 106. The latch 106 is pivoted about a pin 112 which extends through spaced legs 114, which in turn are secured to the top edge of the windshield structure. Upon rotation of the latch 106, the loop 108 is pulled downwardly and forwardly to bring the front supporting structure of the sheet material 80b downwardly into engagement with the top surface of the windshield 12b.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. A convertible top for a boat and the like having a deck or frame structure surrounding a passenger compartment and preceded by a windshield, said top comprising: a pair of generally parallel side rails the front end of which are secured to said windshield and the rear end of which extend downwardly and are secured to the deck, a cross bar having a uniform upper surface extending between said side rails, sheet material extending between said side rails and having attachment means for securing the front end thereof to said windshield and the rear end thereof to said cross bar, said sheet material being securely attached to said cross bar by said attachment means across the length of said cross bar to in and of itself tension the rear end of said sheet, and means for adjustably securing the ends of said cross bar longitudinally of said side rails.

2. The convertible top structure of claim 1 wherein said side rails are bowed upwardly between the front ends thereof and said cross bar.

3. The convertible top structure of claim 1 including: side edge support bars for said windshield, guide means between the front ends of said side rails and said side edge support bars to laterally restrain said side rails when slid along said side edge support bars, and said rear end of said side rails extending downwardly through said deck at generally the same angle as said side edge support bars of said windshield, and whereby said side rails are laterally restrained during raising and lowering relative to said deck.

4. The structure of claim 3 wherein said guide means comprises: an inverted U-shaped bracket on the front end of each side rail with the legs thereof depending from its side rail for insertion over a portion of the windshield structure, said legs having aligned openings therethrough, and a pin extending through said openings for extending through a lateral opening in the windshield structure.

5. The structure of claim 3 wherein: each side rail has a pair of longitudinally extending recesses respective ones of which open outwardly of a respective side of the rail, said rails also having pairs of longitudinally extending retaining lips each pair of which project toward each other and forming sidewalls of a respective recess.

6. The structure of claim 5 including a pair of side curtains, means for fastening a top of each side curtain behind the lips of the inside recess of a respective side rail, means for fastening the sheet material behind the lips of the outside recess, and means for fastening the bottoms of said side curtains to the surrounding structure of said passenger compartment.

7. The structure of claim 5 including: a pair of rollers respective ones of which are positioned in the respective adjacent side recesses of said side rails, and means projecting between the lips of said adjacent recesses and connecting said cross bar to said rollers.

8. The structure of claim 3 wherein one side surface of said cross bar has a longitudinally extending recess, said cross bar also having a pair of longitudinally extending lips which project toward each other and form sidewalls of said recess, and said sheet material having said attachment means secured between said lips.

9. The structure of claim 3 wherein both side surfaces of said cross bar have a longitudinally extending recess, said cross bar also having pairs of longitudinally extending lips each pair of which project toward each other and form sidewalls of a recess, said sheet material having said attachment means secured in a recess, and a second section of sheet material the front end of which has means secured in said other recess, and the opposite end of said second section of sheet material being secured to structure at the rear end of said passenger compartment.

10. The structure of claim 3 including a second section of sheet material extending between said cross bar and the rear of said passenger compartment, said section including side curtains, and means at the lower edge of said side curtains for securing to the structure surrounding the passenger compartment.

11. The structure of claim 1 including: flat plate means having an opening therethrough through which at least a portion of the rear end of the respective side rails project, said side rails having a web and top and bottom flange portions, and said opening in said plate means having a cross-shaped configuration, and each web of said side rails having a horizontal pin therethrough insertable through the lateral portions of said opening to be retained by the underside of the plate when slid longitudinally thereof.

12. The structure of claim 1 wherein each side rail has a longitudinally extending recess opening outwardly of the rail, said rails having a pair of longitudinally extending retaining lips projecting toward each other and forming side walls of said recess, and side curtains having a generally rigid inverted J-shaped upper edge projecting into said recess and hooked around the lower one of said lips.

13. A convertible top for a boat and the like having a frame structure surrounding a passenger compartment and preceded by a windshield, said top comprising: a pair of generally parallel side rails each having a forwardly extending portion the front end of which is secured to the windshield and the rear portion of which extends downwardly and is secured to the frame structure, a cross bar secured between said side rails adjacent the junction of said forwardly and downwardly extending portions, a first section of sheet material extending between said side rails with the rear end thereof secured to said cross bar and the front end thereof secured to said windshield, a second section of sheet material extending over said passenger compartment rearwardly of said cross bar, means for securing the forward end of said second section of sheet material to said cross bar and for securing the rear end of said second section to structure at the rear of said passenger compartment, said sections being gatherable adjacent said cross bar.

14. A convertible top for a boat and the like having a frame structure surrounding a passenger compartment and preceded by a windshield, said top comprising: a pair of generally parallel side rails each having a forwardly extending portion the front end of which is secured to said windshield and a downwardly extending portion the bottom end of which is secured to said frame, a cross bar extending between said side rails and having a normal position adjacent the rear of said forwardly extending portions, sheet material extending between said side rails with the forward end thereof having means for securing to said windshield and with the rear end thereof having means for securing to said cross bar, and means slidingly connecting said cross bar to said side rails for movement from said normal position to a position adjacent said windshield.

15. A convertible top for a boat and the like having a frame structure surrounding a passenger compartment and preceded by a windshield, said windshield having side braces the tops of which extend downwardly and rearwardly at a predetermined angle, said top comprising: a pair of generally parallel side rails the front ends of which extend to said sides braces and the rear ends of which extend downwardly at said predetermined angle through said frame structure, guide means for guiding the front end of said side rails along the top edge of said side braces, means for adjustably securing the front end of said side rails to said side braces, and means for adjustably securing the rear end of said side rails to said frame structure, and whereby the vertical position of said side rails can be adjustably positioned.

16. The structure of claim 15 including: a cross bar extending between said side rails, means securing said cross bar to said side rails for sliding movement longitudinally of said side rails, means for locking said cross bar against sliding movement relative to said side rails, and sheet material the front end of which is fastened to said windshield and the rear end of which is fastened to said cross bar.

17. A convertible top for a boat and the like having a deck or frame structure around a passenger compartment and preceded by a windshield, said top comprising: a pair of generally parallel side rails the front ends of which are secured to said windshield and the rear ends of which extend downwardly and are secured to the deck, a cross bar extending between said side rails, sheet material extending between said side rails and having means for securing the front end thereof to said windshield and the rear end thereof to said cross bar, a pair of side curtains, means for fastening the tops of said side curtains to said side rails, and means for fastening the bottoms of said side curtains to the surrounding structure of said passenger compartment.

18. A convertible top for a boat and the like having a deck or frame structure surrounding a passenger compartment and preceded by a windshield, said top comprising: a pair of generally parallel side rails the front ends of which are secured to said windshield and the rear ends of which extend downwardly and are secured to the deck, each side rail having a smooth upper surface and a pair of longitudinally extending recesses in the adjacent side surfaces thereof, said rails also having pairs of longitudinally extending retaining lips each pair of which project toward each other to form partial side walls of a respective recess, a cross bar extending between said side rails with the upper surface of said cross bar being smooth and being in line with the upper surface of said side rails, said cross bar having end portions projecting into the recesses of respective side rails, means in each recess for slidingly securing said cross bar to its respective side rail, and sheet material fastened to said windshield and to said cross bar and resting on the smooth upper surfaces of said cross bar and side rails.

References Cited

UNITED STATES PATENTS

| | | | |
|---|---|---|---|
| 2,597,224 | 5/1952 | Charron et al. | 16—87.6 |
| 3,165,111 | 1/1965 | Foster | 135—6 |
| 3,203,438 | 8/1965 | Watts et al. | 135—6 |
| 3,367,349 | 2/1968 | O'Link | 135—6 |

PETER M. CAUN, Primary Examiner